W. C. WINFIELD & A. C. TAYLOR.
ELECTRIC SPOT WELDING MACHINE.
APPLICATION FILED SEPT. 18, 1911.

1,063,097.

Patented May 27, 1913.

3 SHEETS—SHEET 3.

ATTEST
E. M. Fisher
F. C. Mussun

INVENTORS
William C. Winfield
Albertis C. Taylor
BY Fisher & Mussun ATTYS.

UNITED STATES PATENT OFFICE.

WILLIAM C. WINFIELD AND ALBERTIS C. TAYLOR, OF WARREN, OHIO, ASSIGNORS TO THE WINFIELD ELECTRIC WELDING MACHINE CO., OF WARREN, OHIO, A CORPORATION.

ELECTRIC SPOT-WELDING MACHINE.

1,063,097.  Specification of Letters Patent.  Patented May 27, 1913.

Application filed September 18, 1911. Serial No. 650,048.

*To all whom it may concern:*

Be it known that we, WILLIAM C. WINFIELD and ALBERTIS C. TAYLOR, citizens of the United States, residing at Warren, in the county of Trumbull and State of Ohio, have invented certain new and useful Improvements in Electric Spot-Welding Machines, of which the following is a specification.

This invention relates to improvements in electric spot-welding machines, and the improvements reside more particularly in the point-holders and welding-points for such machines, all substantially as herein shown and described and more particularly pointed out in the claims.

In welding superimposed sheets or pieces of metal together, a spot-welding machine is often called upon to produce welds in corners or other places where the room is limited or restricted. In this event it is either difficult or impossible to use axially-opposed and parallelly-alined contact pins or welding-points.

Our object, therefore, is to provide holders particularly constructed to support the welding-points in angular relations to produce welds in what may be regarded as otherwise inaccessible places.

A further object is to provide means permit optional use of either parallelly-alined or angularly-related welding-points in the same machine.

A further object is to provide detachable water-circulating connections for the point-holders adapting extension of the water-circulating system to the auxiliary point-holders.

Other objects are embodied in other details of construction as hereinafter more particularly set forth.

Figure 1:
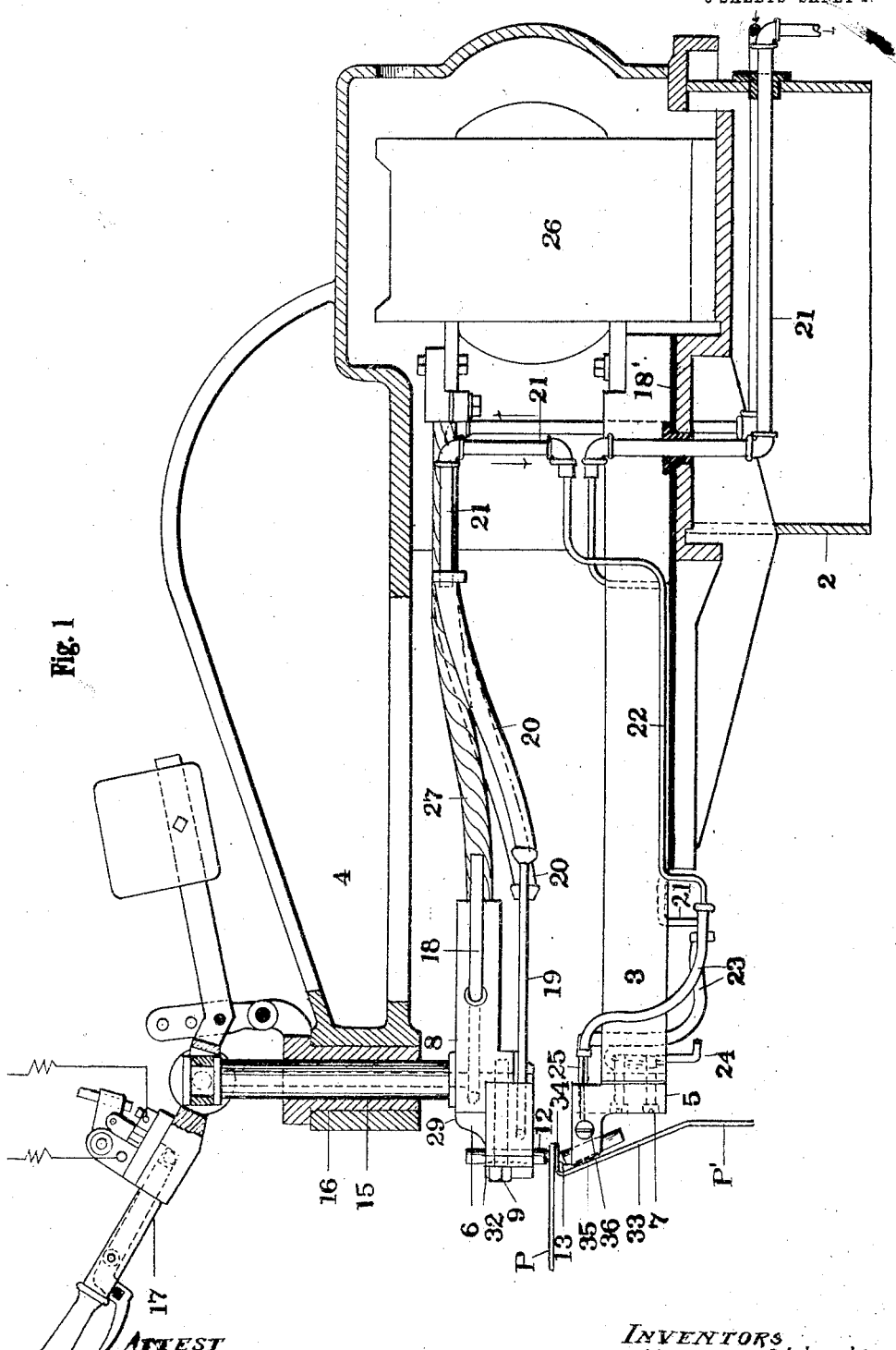
Figure 2:
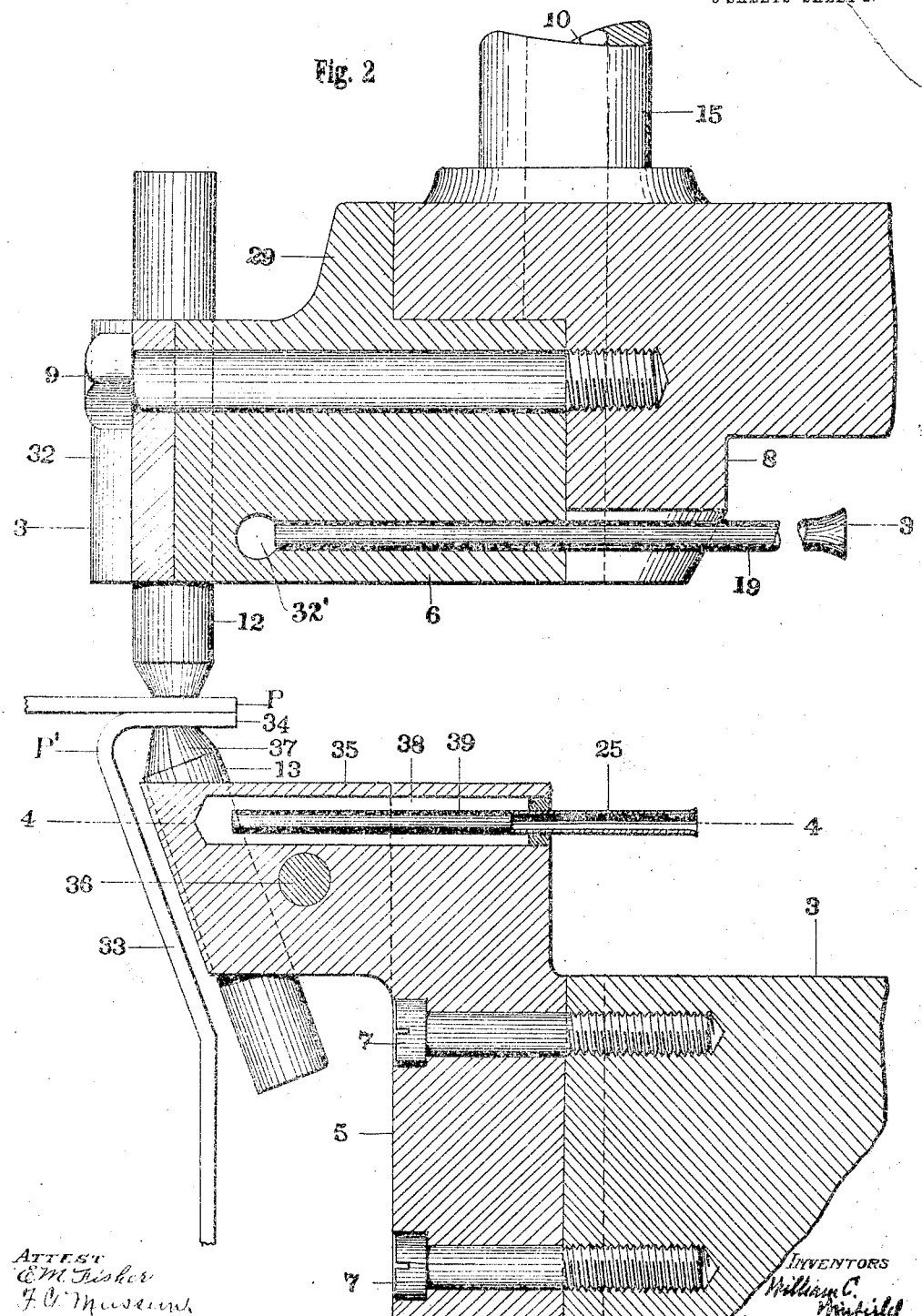
Figure 3:
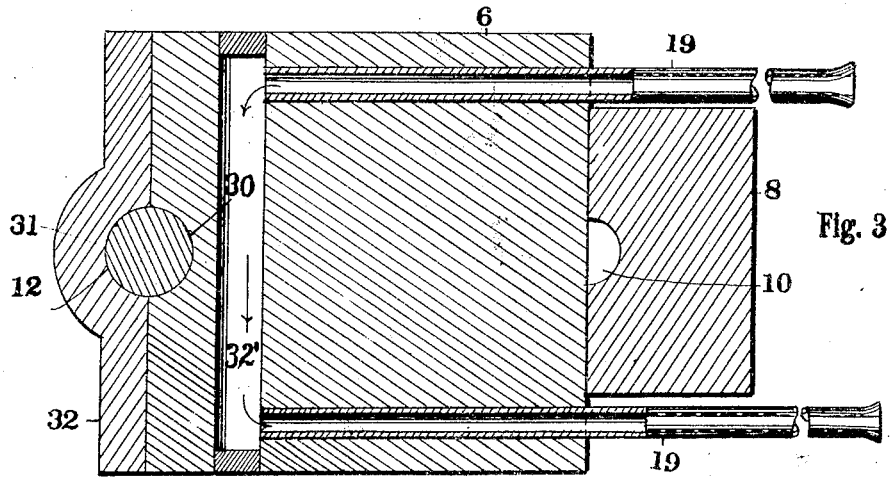
Figure 4:
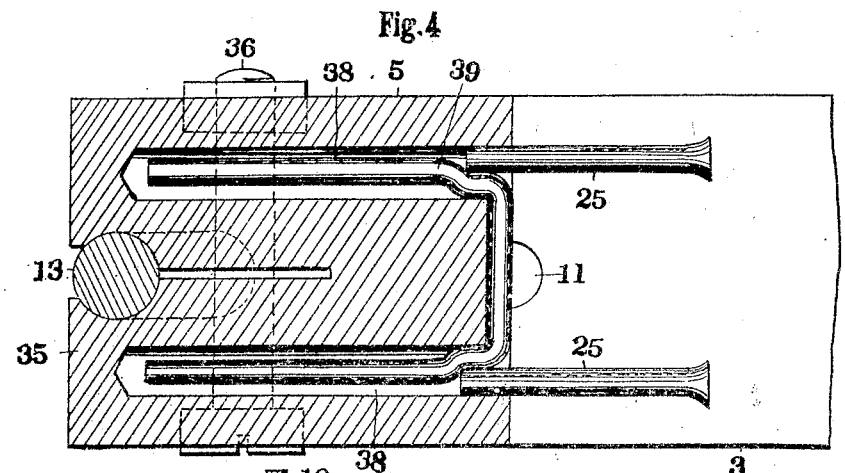
Figure 5:
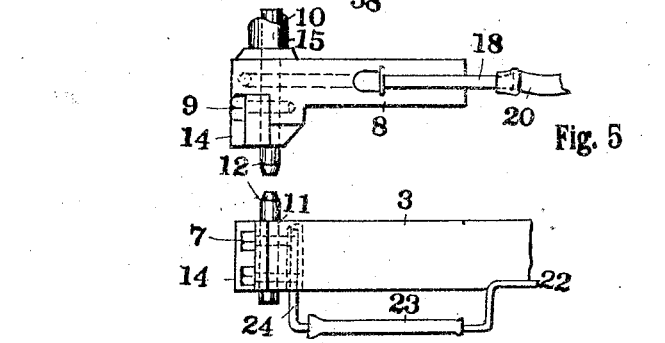

In the accompanying drawings, Figure 1 is a side elevation and part sectional view of an electric welding machine embodying our improvements. Fig. 2, Sheet 2, is a sectional view on vertical lines of the upper and lower point-holders, but on a larger scale than as shown in Fig. 1. Fig. 3 is a horizontal section in plan of the upper point-holder on line 3—3, Fig. 2. Fig. 4 is a sectional view in plan of the lower point-holder on line 4—4, Fig. 2. Fig. 5 is a side view of the main point-holders equipped for clamping a pair of welding points in straight alinement.

As shown, the welding machine comprises a base 2 having an extended copper bar 3 and an overhanging arm 4, each serving to support separate point-holders 5 and 6, respectively,—the first being detachably fixed on bar 3 by screws or bolts 7, and the second being removably secured on a movable head 8 by bolts 9. As a matter of fact, head 8 and the outer end of bar 3 are particularly constructed to serve as the main point-holders, having straight alined openings and recesses 10 and 11, respectively, see Fig. 5, to receive separate welding pins 12—herein otherwise briefly referred to as points. As thus used, the said points are fastened in place by clamps 14, see Fig. 5, but when an angular relation of two welding points is required, the clamps 14 are substituted by holders 5 and 6, which are made to fit upon the same seats for the clamps and are fastened by bolts entering the same screw openings in head 8 and bar 3. Head 8 has a stem 15 slidably mounted in a rotatable sleeve 16 in arm 4, and a pressure-applying lever 17 is connected with stem 15 to raise and lower the head. Water is circulated through head 8 by pipes 18, or through auxiliary holder 6 by pipes 19, when attachment with either set of pipes is made by rubber hose 20 leading to other pipes 21 in the line of supply, and these supply pipes include tubes 22 having flexible connections 23, comprising rubber hose adapted to connect with either of the projecting pipes 24 or 25 in bar 3 and lower point-holder 5, respectively, see Figs. 1 and 5. Head 8 is electrically connected with a transformer 26 at the top of base 2 by one or more copper cables 27, and bar 3 is also connected with said transformer, but insulated from top plate 18' on the base.

Now referring to point holders 5 and 6 in detail, the upper point-holder 6 comprises a block of copper having a lug 29 at its top to abut against the outer end-face of head 8, and its outer end-face has a semi-circular groove 30 vertically therein to match a corresponding groove 31 in clamp 32 to hold the upper welding point 12 in true vertical alinement, clamping being effected by bolts 9 which also fasten point-holder 6 on head 8. Pipes 19 enter point-holder 6 at the rear at either side and open into a cross-bore 32' which is closed by plugs at its ends, said bore being closely related to the welding-point 12 to permit water cooling thereof. The bottom end face of welding-point 12 is flat and at right angles to the longitudinal axis thereof so as to bear uniformly on the upper plate P, which represents a portion of the article being welded. The lower plate P' represents another part of the article, and as shown comprises an inclined wall 33 having a flange 34. The angular corner and inclined wall restrict welding operations or make welding impossible with two straight axially-alined welding-points, and therefore, point-holder 5 is particularly constructed with a split extension 35 having an inclined opening between its split portions adapted to clamp lower point 13 adjustably therein, clamping being effected by transverse bolt or screw 36. The end-face of extension 35 is also inclined or cut away to allow welding to take place under restrictions substantially as shown. Constructively, lower point 13 has a welding end 37, of ungulate formation, the oblique plane or face thereof being brought to a horizontal plane directly opposite the welding end of the upper point 12 by adjustment of the points in their respective holders. Point-holder 5 and point 13 are kept cool by circulation of water in the two bores 38 formed in extension 35, the rearwardly projecting pipes 25 serving as inlet and outlet pipes and communication between the bores being obtained by a U-shaped pipe 39, connecting the rear ends and extending to the front ends of said bores.

What we claim is:

1. In a spot-welding machine, a vertically-movable point-holder and a fixed point-holder, each having water circulating devices in combination with a set of auxiliary point-holders removably mounted on said movable and fixed point-holders and having water-circulating devices of their own, and water supply connections for said machine having detachable attachment with the water-circulating devices of either set of point-holders.

2. In a spot-welding machine, a set of main point-holders having water-circulating passages and a set of auxiliary point-holders having water-circulating channels, in combination with water supply pipes having connections adapted to detachably unite with either of said point-holders.

3. In a spot-welding machine, a set of oppositely-mounted main point-holders having water supply tubes detachably connected therewith, in combination with a set of auxiliary point-holders having separate water-circulating means adapted to connect with said supply tubes, and means to detachably secure said auxiliary point-holders upon said main point-holders.

4. In a spot-welding machine, a point-holder having water inlet and outlet pipes extending therefrom, in combination with an auxiliary point-holder having water inlet and outlet pipes extending therefrom and a set of water-supply tubes having detachable connection with said pipes.

5. In a spot-welding machine, a set of auxiliary point-holders, each having projecting water inlet and outlet pipes, in combination with detachable water-supply connections for said pipes.

6. In a spot-welding machine, a pair of oppositely mounted point-holders and separate welding points secured in said holders in angularly-alined relations, the lower point being inclined and the upper point vertical, and said points provided with welding end faces lying oppositely in parallel planes.

7. In a spot-welding machine, a point-holder and a welding-point supported thereby, in combination with a second welding-point mounted at an inclination to said first named point and having a welding end-face in an oblique plane to its longitudinal axis, and the upper of said welding points being movable and pressure applying means adapted to bear thereon.

8. In a spot-welding machine, a point-holder comprising a metal block having a seat for a welding-point disposed at an inclination to a vertical plane, a welding-point therein and means to secure said point adjustably in said seat.

In testimony whereof we affix our signatures in presence of two witnesses.

WILLIAM C. WINFIELD.
ALBERTIS C. TAYLOR.

Witnesses:
 HELEN BEACH,
 A. E. WONDERS.